(12) United States Patent
Davey et al.

(10) Patent No.: US 7,024,443 B2
(45) Date of Patent: Apr. 4, 2006

(54) METHOD AND SYSTEM FOR PERFORMING A FAST-FOURIER TRANSFORM

(75) Inventors: Stephen W. Davey, Plymouth (GB); Maamoun Abouseido, Ottawa (CA); Kevin W Forrest, Plymouth (GB)

(73) Assignee: 1021 Technologies KK, Yokohama (JP)

( * ) Notice: Subject to any disclaimer, the term of this patent is extended or adjusted under 35 U.S.C. 154(b) by 678 days.

(21) Appl. No.: 10/290,298

(22) Filed: Nov. 8, 2002

(65) Prior Publication Data

US 2004/0034677 A1    Feb. 19, 2004

(30) Foreign Application Priority Data

Aug. 15, 2002 (GB) .................................. 0219015

(51) Int. Cl.
*G06F 17/14* (2006.01)
(52) U.S. Cl. ...................................... 708/404; 708/406
(58) Field of Classification Search ................ 708/403, 708/404, 405, 406
See application file for complete search history.

(56) References Cited

U.S. PATENT DOCUMENTS

| | | | | |
|---|---|---|---|---|
| 3,871,577 A | * | 3/1975 | Avellar et al. ............... | 708/404 |
| 4,787,055 A | | 11/1988 | Bergeon et al. | |
| 5,583,803 A | * | 12/1996 | Matsumoto et al. ........ | 708/401 |
| 6,115,728 A | * | 9/2000 | Nakai et al. ................ | 708/404 |
| 6,430,587 B1 | * | 8/2002 | Orling ........................ | 708/404 |

FOREIGN PATENT DOCUMENTS

| | | |
|---|---|---|
| WO | WO 98/18083 A1 | 4/1998 |
| WO | WO 02/48901 A2 | 6/2002 |

* cited by examiner

*Primary Examiner*—Chuong D. Ngo
(74) *Attorney, Agent, or Firm*—Oliff & Berridge, PLC

(57) ABSTRACT

In a method for performing a fast-Fourier transform (FFT), input data samples are written to a storage instance in a data input step, then subjected to a processing step in which the stored input samples are read out of the storage instance and processed in accordance with a transformation algorithm. The resulting output data samples are written back to the storage instance and, in a transformed data output step, read out of the storage instance, successively received batches of the input data samples being fed cyclically to a plurality of such multiple-function storage instances. Each batch is fed to a respective storage instance such that, at any given time during performance of the method, the input, processing and output steps are being performed simultaneously in respect of different batches using different respective storage instances. For each received data input batch, the processing step comprises a plurality of calculation passes creating intermediate data values which are stored between passes in both the respective multiple function storage instance and a further storage instance which is substantially dedicated for use in such processing steps. The invention also includes a related method for performing an inverse fast-Fourier transform (IFFT), as well as FFT and IFFT systems.

24 Claims, 19 Drawing Sheets

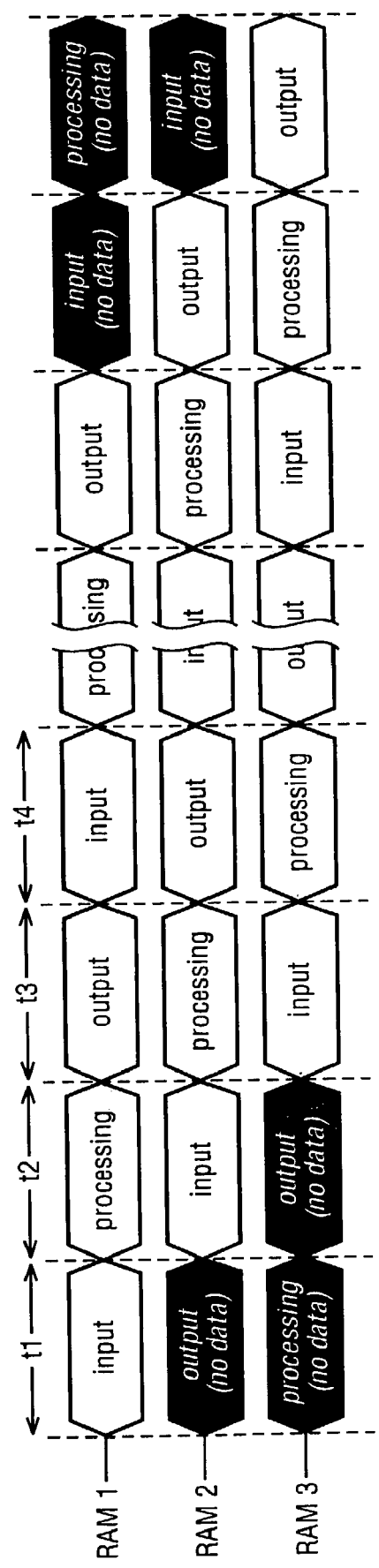

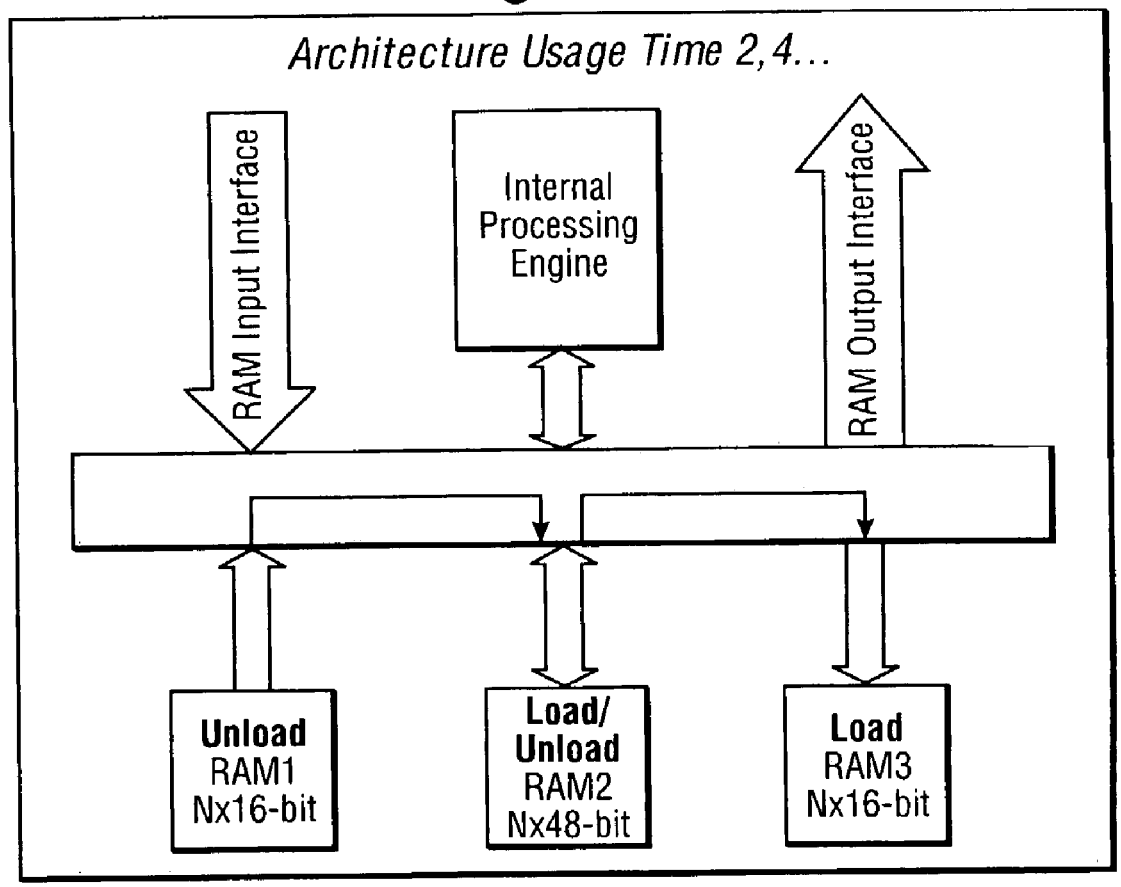

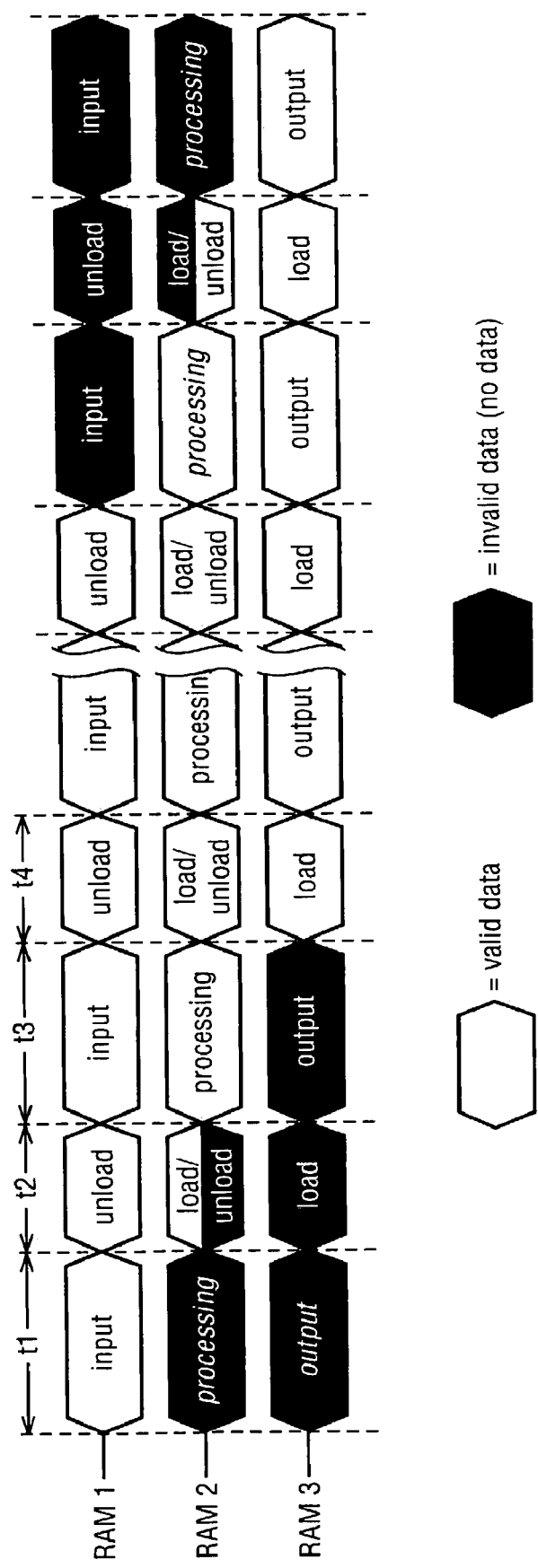

The Butterfly

Butterfly Pattern

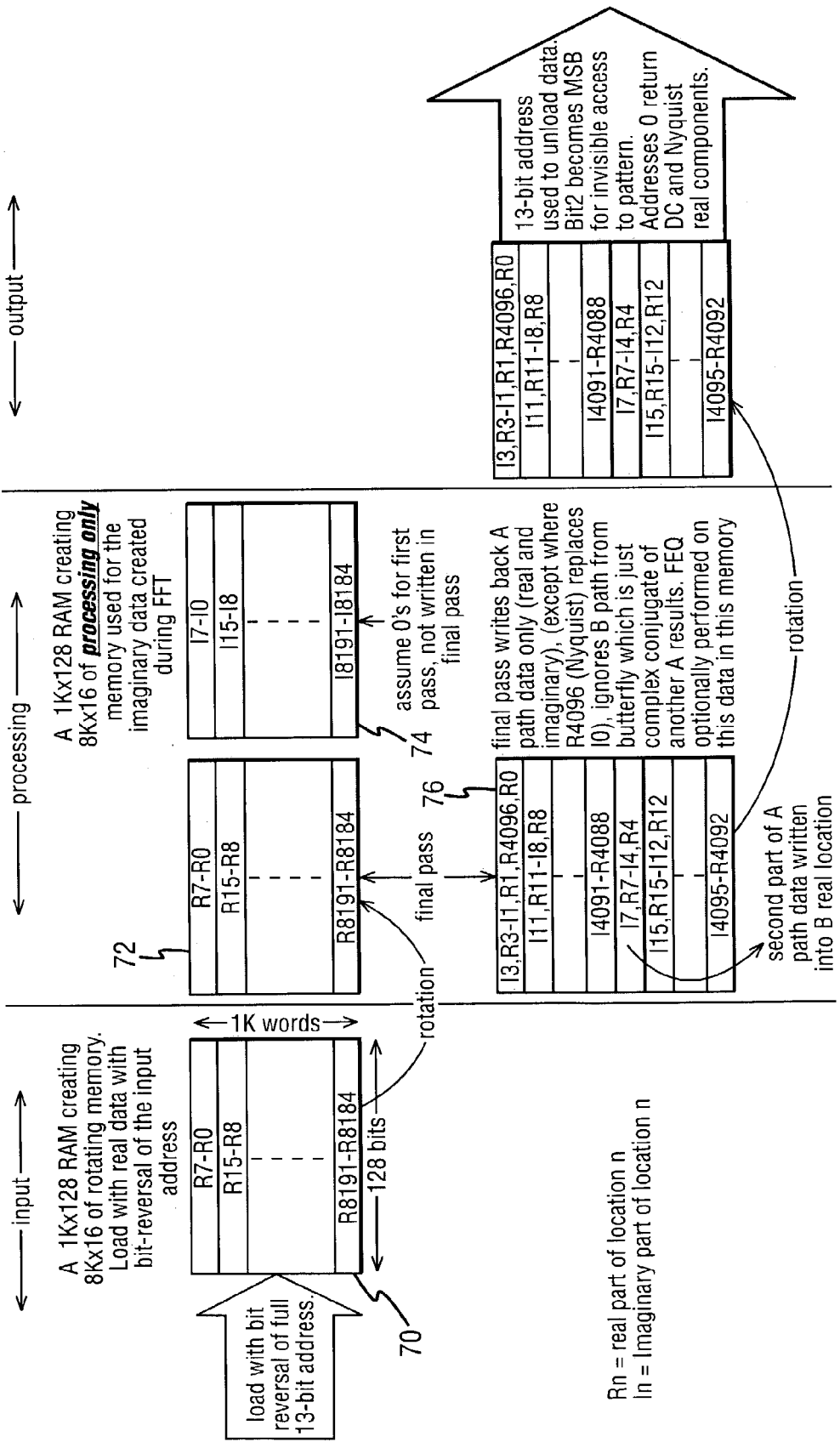
Fig. 6 FFT Data Flow for 8192-pt FFT

Fig. 7A

| data (90) | source (92) |
|---|---|
| 0 (DC) | 0 (DC) |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| 11 | 11 |
| 12 | 12 |
| 13 | 13 |
| 14 | 14 |
| 15 | 15 |
| 16 (Nyquist) | 16 (Nyquist) |
| 17 | 15* |
| 18 | 14* |
| 19 | 13* |
| 20 | 12* |
| 21 | 11* |
| 22 | 10* |
| 23 | 9* |
| 24 | 8* |
| 25 | 7* |
| 26 | 6* |
| 27 | 5* |
| 28 | 4* |
| 29 | 3* |
| 30 | 2* |
| 31 | 1* | processed bin 19 created from complex conjugate of bin 13

32 frequency pairs to be processed | 16 frequency pairs used to create data

Fig. 7B

| shuffled data (94) | source (96) | | |
|---|---|---|---|
| 0 (DC) | 0 (DC) | 1a | group 1 |
| 16 (Nyquist) | 16 (Nyquist) | | |
| 8 | 8 | 1b | |
| 24 | 8* | | |
| 4 | 4 | 1a | group 2 |
| 20 | 12* | | |
| 12 | 12 | 1b | |
| 28 | 4* | | |
| 2 | 2 | 1a | group 3 |
| 18 | 14* | | |
| 10 | 10 | 2a | |
| 26 | 6* | | |
| 6 | 6 | 2b | |
| 22 | 10* | | |
| 14 | 14 | 1b | |
| 30 | 2* | | |
| 1 | 1 | 1a | group 4 |
| 17 | 15* | | |
| 9 | 9 | 2a | |
| 25 | 7* | | |
| 5 | 5 | 3a | |
| 21 | 11* | | |
| 13 | 13 | 4a | |
| 29 | 3* | | |
| 3 | 3 | 4b | |
| 19 | 13* | | |
| 11 | 11 | 3b | |
| 27 | 5* | | |
| 7 | 7 | 2b | |
| 23 | 9* | | |
| 15 | 15 | 1b | |
| 31 | 1* | | |

32 frequency pairs as processed | 16 frequency pairs used to create data

First Pass IFFT Processing Order

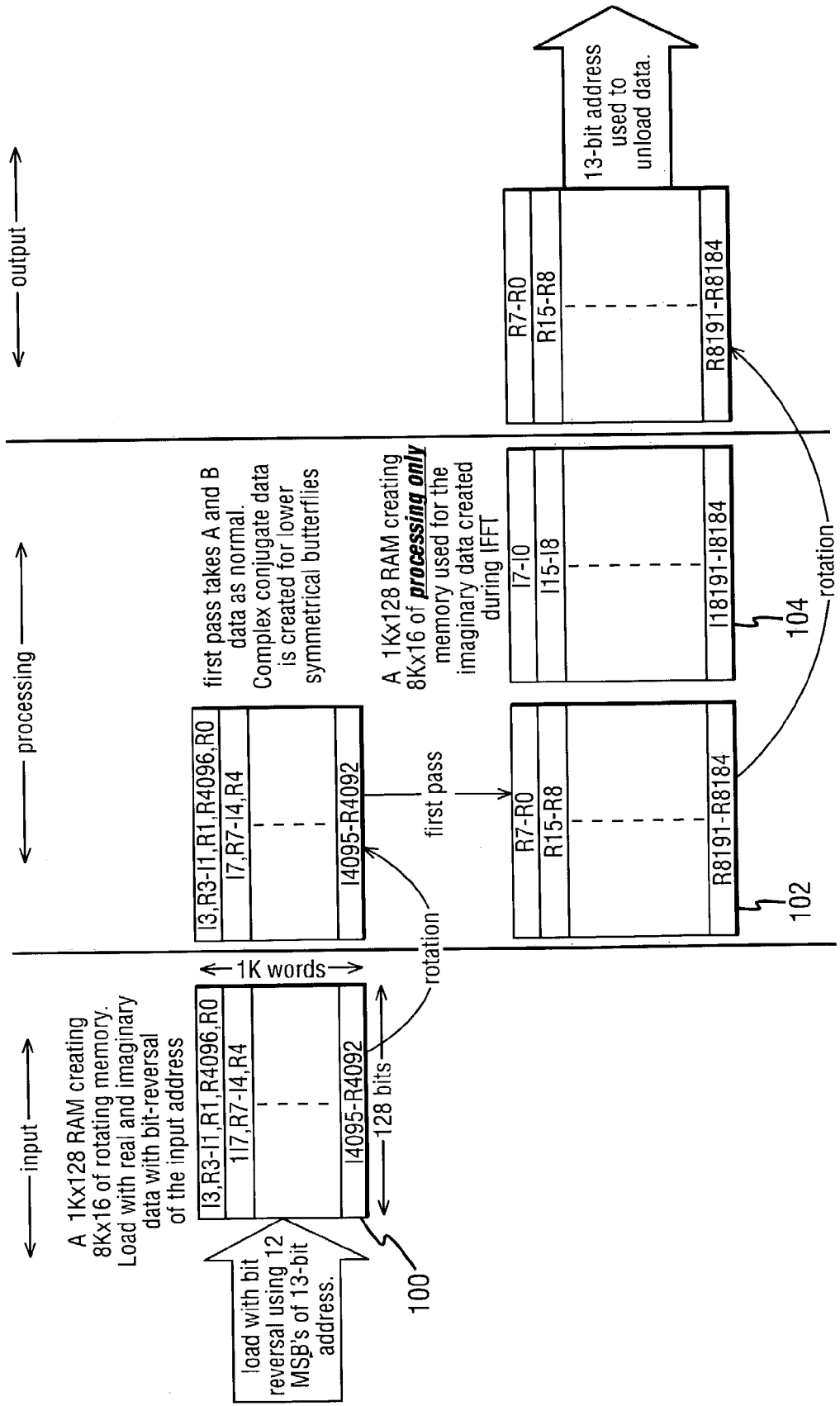
Fig. 8 IFFT Data Flow for 8192-pt IFFT

METHOD AND SYSTEM FOR PERFORMING A FAST-FOURIER TRANSFORM

FIELD OF THE INVENTION

This invention relates to a method of performing a fast-Fourier transform (FFT) and to an FFT processing system.

BACKGROUND OF THE INVENTION

High performance complex FFT algorithms require quantities of RAM to allow parallel data input, processing and output. Alternative low memory algorithms result in much lower performance, either due to reformatting of data prior to processing, or because they do not offer parallel operation of input, processing and output. Such algorithms are used in modems for digital communications, for instance, in a VDSL (very high-speed digital subscriber line) modem in which it is important to perform FFT and inverse-FFT (IFFT) processes in real time.

A conventional method for rapid FFT processing uses three banks of memory which, for each transform (FFT or IFFT) operation, act respectively as an input memory bank for loading data samples, as a processing memory bank for use in processing the data samples, and as an output memory bank for delivery of the transformed data samples. The architecture of a system for performing such a method is shown in the block diagram of FIG. 1A. FIGS. 1B, 1C and 1D are related block diagrams showing the passage of data between the system in successive transform operations. FIGS. 1E and 1F are is an associated timing and memory management diagrams.

Referring to FIGS. 1A to 1E, incoming data samples are passed from a RAM input interface 20 to one of three banks 22, 24, 26 of RAM according to the FFT operation being performed, via decode logic 28. In a first time period t1 (FIG. 1B), the incoming data samples are passed to RAM bank 22 (RAM 1), whereas in time periods t2 (FIG. 1C) and t3 (FIG. 1D), incoming samples are passed to RAM banks 24 (RAM 2) and 26 (RAM 3) respectively. In each FFT operation, received samples which have been stored in RAM are passed to a dedicated internal processing engine 30 which performs successive 'butterfly' operations to implement the FFT algorithm, the number of butterfly operations depending on the number and size of samples to be processed. Accordingly, in time period t2, samples received in RAM 22 in time period t1 are read by processing engine 30, processed, and written back to the same RAM 22. Concurrently, new data samples are being loaded into RAM 26, as shown in FIGS. 1C and 1E. In time period t3, the processed samples in RAM 22 are read to the RAM output interface 32 whilst the input samples loaded into RAM 26 are processed by the processing engine 30 and further new data samples are loaded into RAM 24, as shown in FIGS. 1D and 1E. It will be seen that the functions of loading, processing and delivery are rotated between the three banks of RAM 22, 24, 26 from FFT operation to operation, each acting successively as an input RAM, processing RAM and output RAM.

In the example shown in the drawings, an N point 16-bit FFT is performed and, in order to increase computational accuracy, a 24-bit processor is used. In each bank of RAM there are three N×16-bit RAM instances, making N×48-bit of RAM in each bank, as shown in FIG. 1A. The first instance is used for the real component of the data, the second instance for the complex component, and the third instance for sign extension to 24 bits.

An alternative illustration of the memory management scheme described above is given by the diagram of FIG. 1F. Each line 34 in FIG. 1F represents the different functions of one N×16-bit RAM instance referred to above. For each such line 34, there are three N×16-bit RAM instance and, at any instant in time, one is used for data input, one for processing and one for data output. Typically, one line is used for the real component of data, the second line for the complex component, and the third for sign extension.

In an alternative known method, less memory is used but performance is poorer because data samples are loaded into an input memory and pre-sorted into a processing memory before processing begins and because data needs to be post-sorted into an output memory. This is illustrated in FIGS. 2A to 2D. The system architecture in this case has a first N×16-bit input RAM 40, a second N×48-bit processing RAM 42 and a third N×16-bit output RAM 44. As shown in FIGS. 2B, 2C and 2D, the three RAMs 40, 42 and 44 are each dedicated to their particular function in that there is no rotation between functions. Between each input, processing and output step there is a loading and/or unloading step in which the pre- and post-sorting takes place. This adds significantly to the time taken to complete processing from receipt of samples via the RAM input interface 20 to the delivery of transformed data samples via the RAM output interface 32.

It will be noted from FIG. 2A that, in this example, the input and output RAMs are only N×16-bit RAMs. This is because the complex component in the received data samples is 0 and the bits for sign extension are redundant, and because in the output data, which contains both real and complex components, only samples 0 to N/2 are unique. From (N/2+1) to (N−1) the samples are the complex conjugates of previous samples. When loading data for an N-point IFFT with a real output, only the samples 0 to N/2 are unique. Again, the input samples from (N/2+1) to (N−1) are simply complex conjugates of the previous samples.

It is an object of the present invention to provide a method and a system which combine the advantages of speed and reduced memory requirement.

SUMMARY OF THE INVENTION

According to a first aspect of the invention, there is provided a method of performing a fast-Fourier transform (FFT) in which input data samples are written to a storage instance in a data input step, then subjected to a processing step in which the stored input samples are read out of the storage instance and processed in accordance with a transformation algorithm, the resulting output data samples being written back to the storage instance, and, in a transformed data output step, read out of the storage instance, successively received batches of the input data samples being fed cyclically to a plurality of such multiple-function storage instances, each batch to a respective instance, such that, at any given time during performance of the method, the input step, the processing step and the output step are being performed simultaneously in respect of different batches using different respective storage instances, wherein, for each received data input batch, the processing step comprises a plurality of calculation passes creating intermediate data values which are stored between passes in both the respective one of the multiple-function storage instances and a further storage instance substantially dedicated for use in such processing steps.

Preferably, the sharing of the storage of the intermediate data values between the multiple-function storage instances and the dedicated storage instance is such that, of the data making up the intermediate values, at least as much data is stored in the dedicated storage instance as in the respective multiple-function storage instance. The sharing of data may be such that the real values are stored in the multiple-function storage instance and the imaginary values in the dedicated storage instance. In the preferred method, the processing step has a final calculation pass producing first and second sets of output data samples derived from the respective input data, the samples of the second set being the complex conjugates of the samples of the first set. In this case, the real and imaginary parts of the first set only are stored in the respective multiple function storage instance. The output step in which the transformed data is read out of the multiple function storage may include address decoding to cause the data to be read out in a different order from that in which it was stored at the end of the processing step.

In this way, the FFT transformation can be performed at a similar speed to that achieved in the first prior art method mentioned above, but with a much-reduced storage requirement since only part of the total storage capacity is required in all three steps of the method.

According to a second aspect of the invention, there is provided a method of performing an inverse fast-Fourier transform (IFFT) in which input data samples are written to a storage instance in a data input step, then subjected to a processing step in which the stored input samples are read out of the storage instance and processed in accordance with a transformation algorithm, the resulting output data samples being written back to the storage instance, and, in a transformed data output step, read out of the storage instance, successively received batches of the input data samples being fed cyclically to a plurality of such multiple-function storage instances, each batch to a respective instance, such that, at any given time during performance of the method, the input step, the processing step and the output step are being performed simultaneously in respect of different batches using different respective storage instances, wherein, for each received data input batch, the processing step comprises a plurality of calculation passes creating intermediate data values which are stored between passes in both the respective one of the said multiple-function storage instances and a further storage instance substantially dedicated for use in such processing steps. Again, intermediate data values are shared between the multiple-function and dedicated storage instances, preferably with the real values stored in the multiple-function instance.

In the case of the IFFT method, the processing step may have an initial calculation path including the generation of the complex conjugates of samples stored in the respective multiple-function storage instance in the data input step. The data input step may include writing the input data samples to the respective multiple-function storage instance with bit-reversed addressing.

In both methods, computational accuracy may be increased by performing the processing step with increased resolution, e.g. using a 24-bit processor on 16-bit input samples. This results in sign extension during the processing step (as distinct from the input and output steps), and such data can be accommodated in the dedicated storage instance.

According to a third aspect of the invention, a fast-Fourier transformation system for transforming input data samples received in batches at a system input into transformed output data samples delivered to a system output in corresponding batches comprises: a plurality of multiple-function storage instances; control means for controlling writing of data to and reading of data from the storage instances; and a processor core arranged to read stored data samples, to process them in accordance with a transformation algorithm and to store the resulting output data samples, each received input data batch being subjected to a plurality of calculation passes creating intermediate data values which are stored between the passes; wherein the control means are arranged such that successively received input data sample batches are fed cyclically in a data input step to the multiple-function storage instance, each batch being fed to a respective one of the storage instances, such that the data samples processed in the processor core as part of a processing step are read from the same storage instance as that to which they were fed when received from the system input as input data samples in the data input step and the resulting output data samples being written to the same storage instance and, in a data output step, read from the same storage instance to the system output, and such that the input step, the processing step, the output step are performed simultaneously in respect of different batches using different respective storage instances, and wherein the system further comprises a further storage instance, the control means being further arranged such that the said intermediate data values are stored in both the respective multiple-function storage instance in which the corresponding input samples were stored and in the further storage instance, the primary function of the further storage instance being the storage of the intermediate values.

The storage capacity of the further storage instance is at least as large as that of each of the multiple-function storage instances.

According to a fourth aspect of the invention, an inverse fast-Fourier transformation system is correspondingly constructed.

The method also includes a method of performing an FFT or IFFT having a data input step in which received input data samples are written in successive batches from an input to a memory, a processing step in which the samples are read out of the memory and processed in accordance with a transformation algorithm, the resulting output data samples being written back to the memory, and a data output step in which the output samples are delivered to an output by reading them from the memory. For speed of operation, a plurality of rotating memory areas are used in that each area functions successively in the input step, the processing step and the output step in a cyclical way and in that, while one area is delivering to the output data samples corresponding to a first batch of input data samples, another is used in the processing of samples of a second such batch, and another is received samples of a third such batch from the input. The processing step comprises, for each batch, a series of calculation passes creating intermediate data values which are stored between passes. By using the respective rotating memory area and a further memory area, which is substantially dedicated to use during the processing step, to store the intermediate data values between calculation passes, it is possible to reduce the required capacity of the rotating memory areas.

In one embodiment, three rotating memory areas are used such that, at any given time during performance of the method, one area is being used for receiving input data samples, another of the areas is used for storing data during the processing step, and the third area is used for reading out the transformed data samples, all simultaneously. When these simultaneously performed steps are completed, the functions rotate between the three memory areas and the input, processing, and output steps are performed again. In a typical implementation of this embodiment, in which the FFT or IFFT algorithm is performed with greater resolution than that of the input and output data to the extent that sign extension data requires a similar amount of memory to that required for storing real data values during the processing step, the potential saving in memory capacity over the first above-mentioned prior art system is in the region of 44%.

Multiple-channel embodiments advantageously perform a number of fast-Fourier or inverse fast-Fourier transforms sequentially rather than in parallel using a plurality of simultaneously operating processing engines all of which may make use of a memory area the capacity of which is preferably no greater than that required for processing using a single processing engine. In this case, although each memory area acts sequentially for data input, processing, and data output, the time period over which it is used during each processing step is shorter than each period during which it serves for data input and data output. This is because the time taken to perform the transformation algorithm is shorter when using multiple processing engines. Each memory area may act sequentially for data input, processing, and data output on one channel, then the same steps sequentially on another channel, and so on until it has handled the transformation for each of the multiple channels, whereupon it again receives data for the first channel. In other words, when the memory area rotates to a new data input location it loads data in a different channel from that which it previously handled.

In this way, multiple channel transformations can be performed with a memory capacity saving significantly in excess of the saving achieved for the single-channel embodiment referred to above. For example, it is possible to achieve a memory capacity saving in the region of 70% for a four-channel system.

The invention will be described below by way of example with reference to the drawings.

BRIEF DESCRIPTION OF THE DRAWINGS

In the drawings:—

FIG. 1E is a timing diagram relating to the system shown in FIGS. 1A to 1D;

FIGS. 2B and 2C are block diagrams corresponding to FIG. 2A showing the flow of data between different elements of the system of FIG. 2A at different times;

FIG. 2D is a timing diagram for the system of FIGS. 2A to 2C;

FIG. 6 is a data flow diagram for an 8192-point FFT performed in accordance with the invention;

FIGS. 7A and 7B are diagrams illustrating the first stage in the performance of an IFFT, in simplified form;

FIG. 8 is a data flow diagram for an 8192-point IFFT performed using the system of FIG. 5;

DETAILED DESCRIPTION OF THE PREFERRED EMBODIMENTS

In accordance with a preferred embodiment of the invention, an N-point 16-bit FFT is performed at the same speed as in the first prior art embodiment described above with reference to FIGS. 1A to 1F, but with reduced RAM usage. Referring to FIGS. 3A to 3E, as in the prior art systems, the architecture of the preferred embodiment of the invention has a RAM input interface 20 from which data is passed to three RAMs 50, 52 and 54 according to the FFT operation being performed, via decode logic 28. When the input RAM is ready for processing, as in the first prior art system, no data movement is employed. Instead, the RAMs are essentially rotated insofar as their functions are rotated. The input RAM becomes the processing RAM, the processing RAM becomes the output RAM, and the output RAM becomes the input RAM, as is evident from FIGS. 3B to 3F. This rotation is essentially achieved by manipulating the MSBs of the addresses used to access the RAMs 50, 52 and 54. As before, there is a dedicated internal processing engine 30 and a RAM output interface 32 (see FIG. 3A).

Figure 1A:
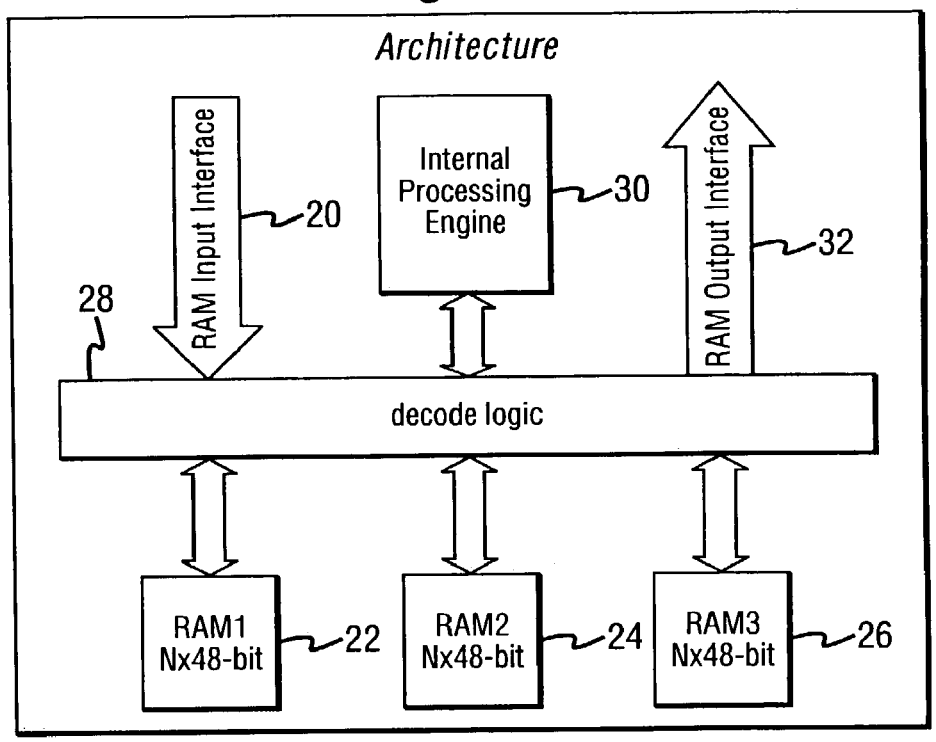
FIG. 1A is a block diagram illustrating the architecture of a first prior art system for performing an FFT.
Figure 1B:
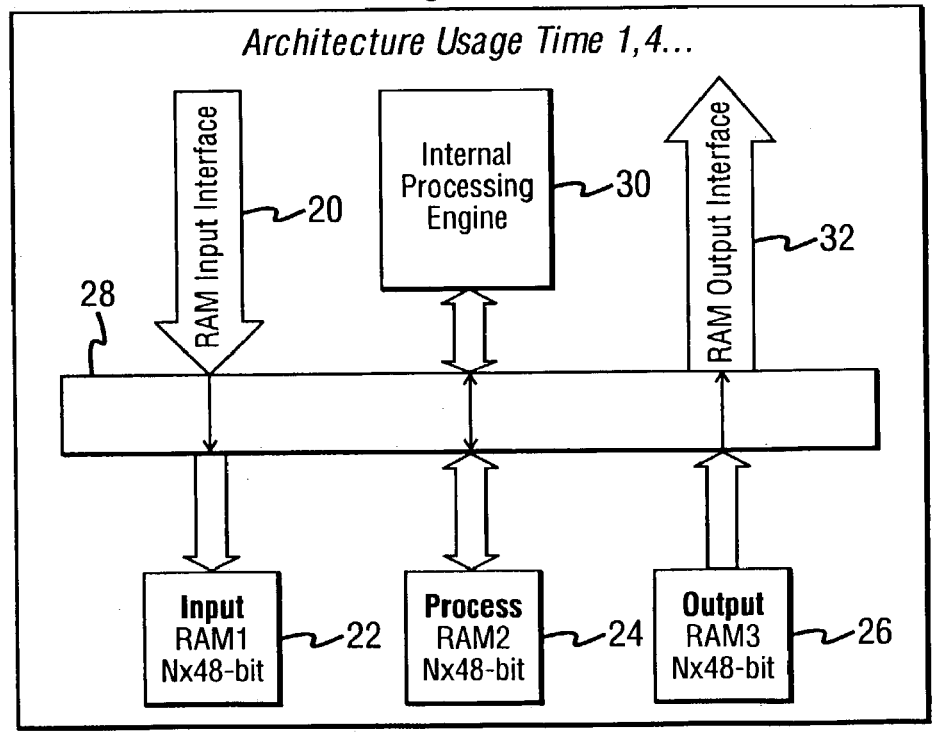
FIGS. 1B, 1C and 1D are block diagrams corresponding to FIG. 1A showing the flow of data between elements of the system of FIG. 1A at different times.
Figure 1C:
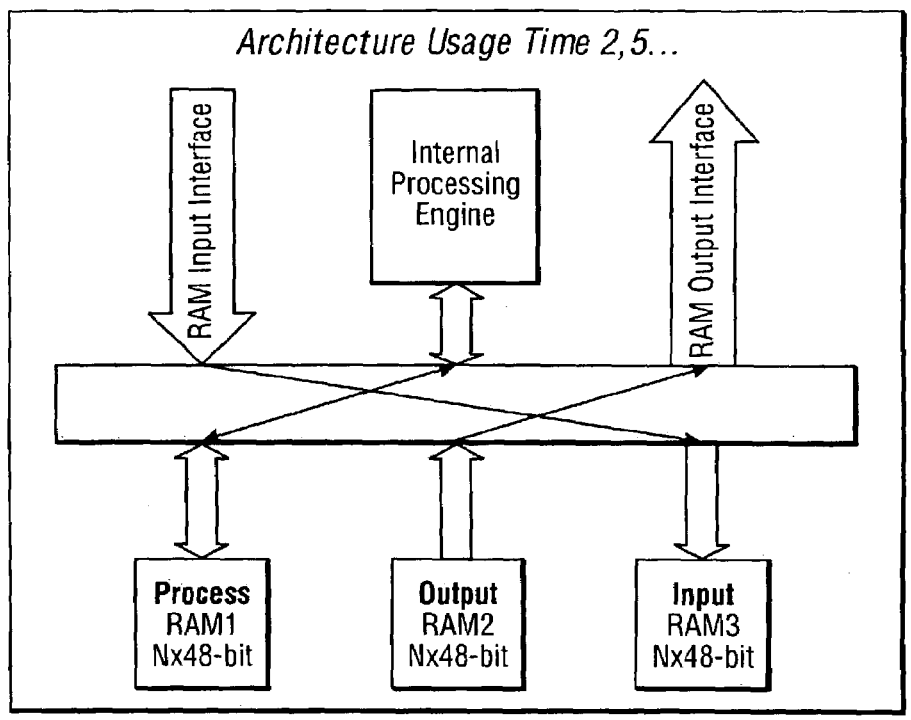
Figure 1D:
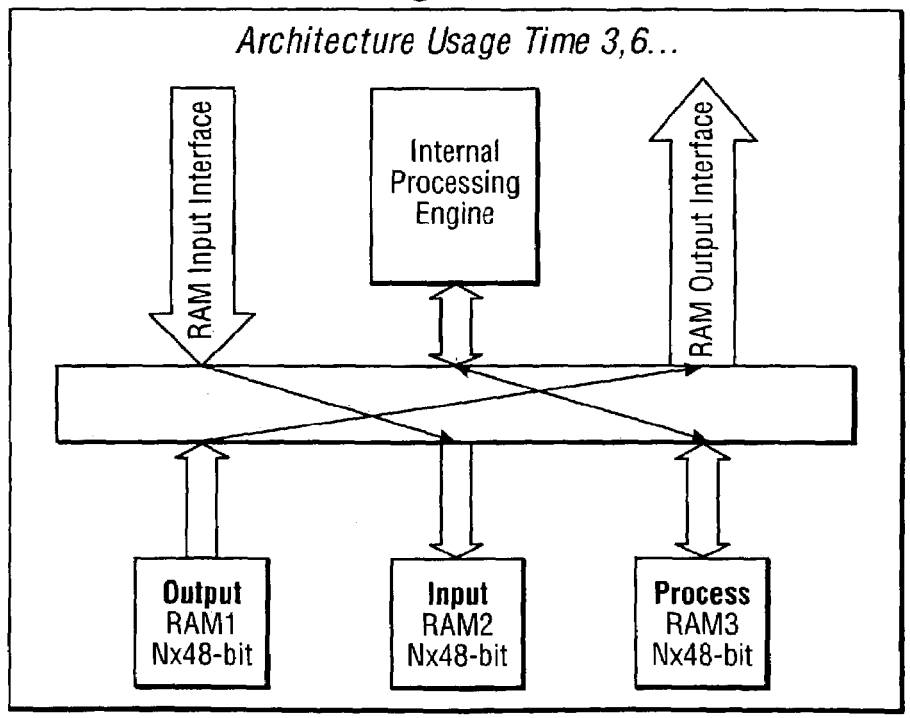
Figure 1F:
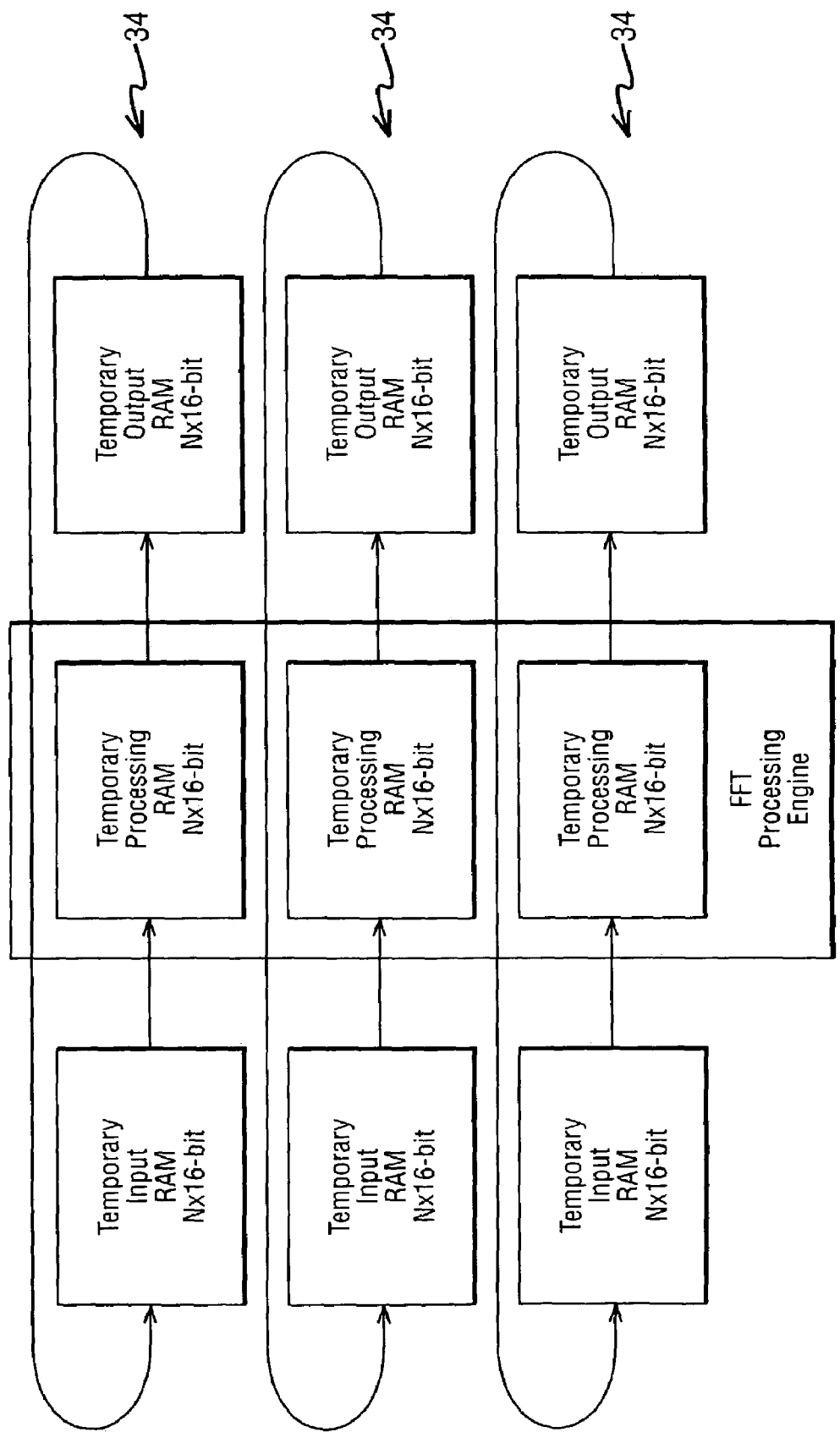
FIG. 1F is a memory management block diagram relating to the system of FIGS. 1A to 1D.
Figure 2A:
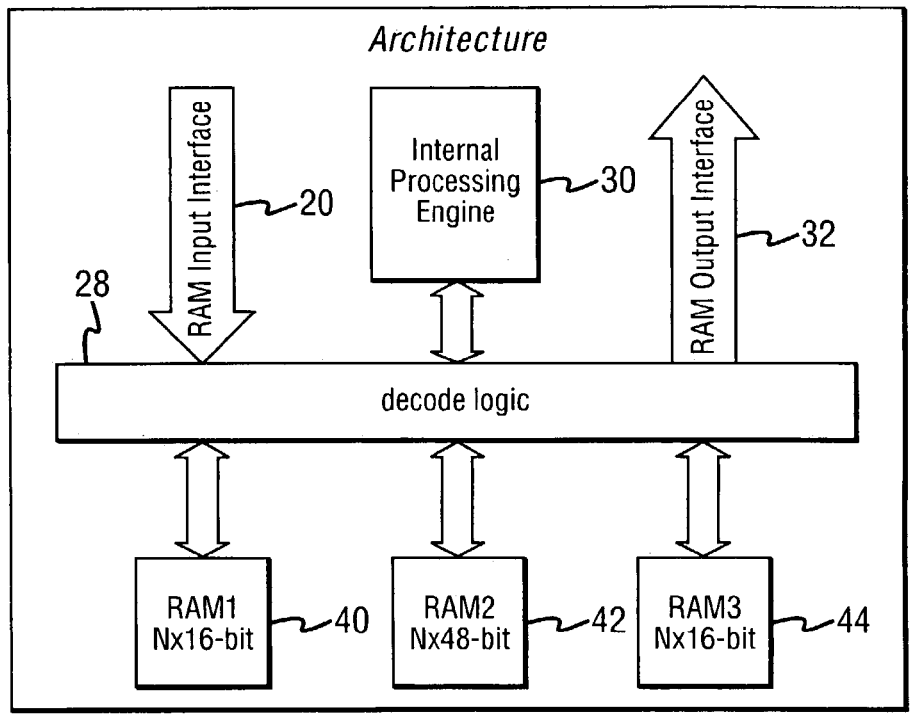
FIG. 2A is a block diagram illustrating the architecture of a second prior art system for performing an FFT.
Figure 2B:
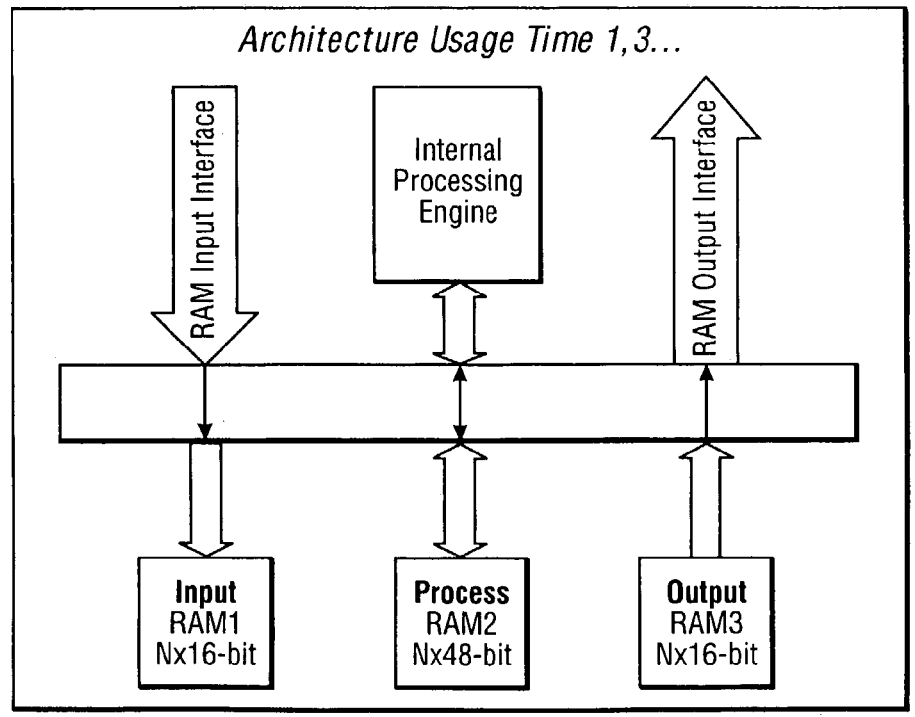
Figure 3A:
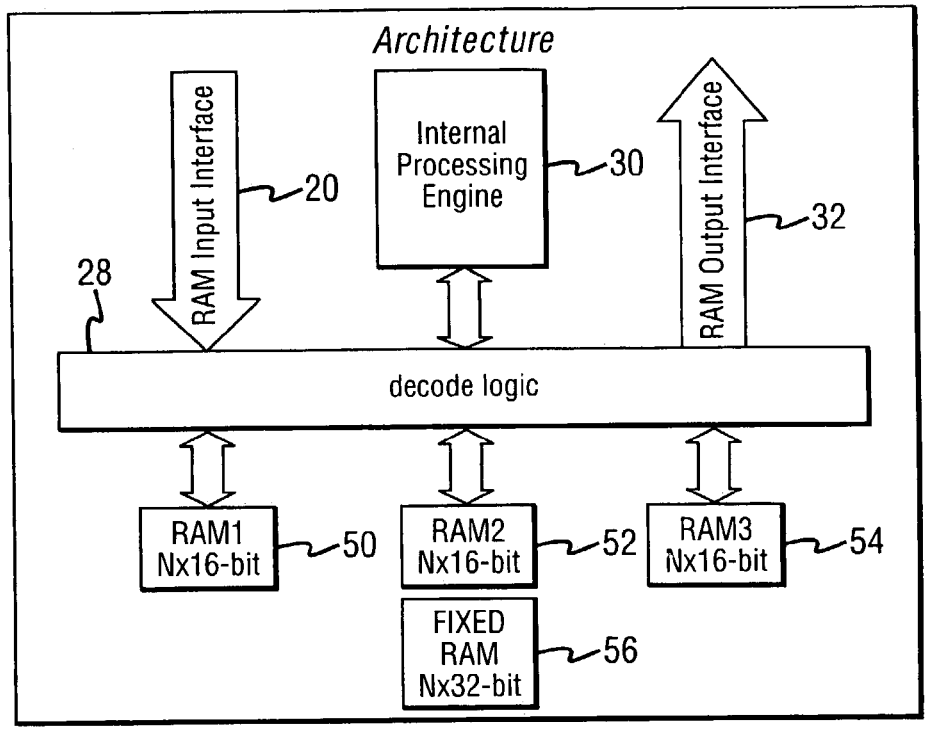
FIG. 3A is a block diagram showing the architecture of a system for performing an FFT or an TFFT, in accordance with the invention.
Figure 3B:
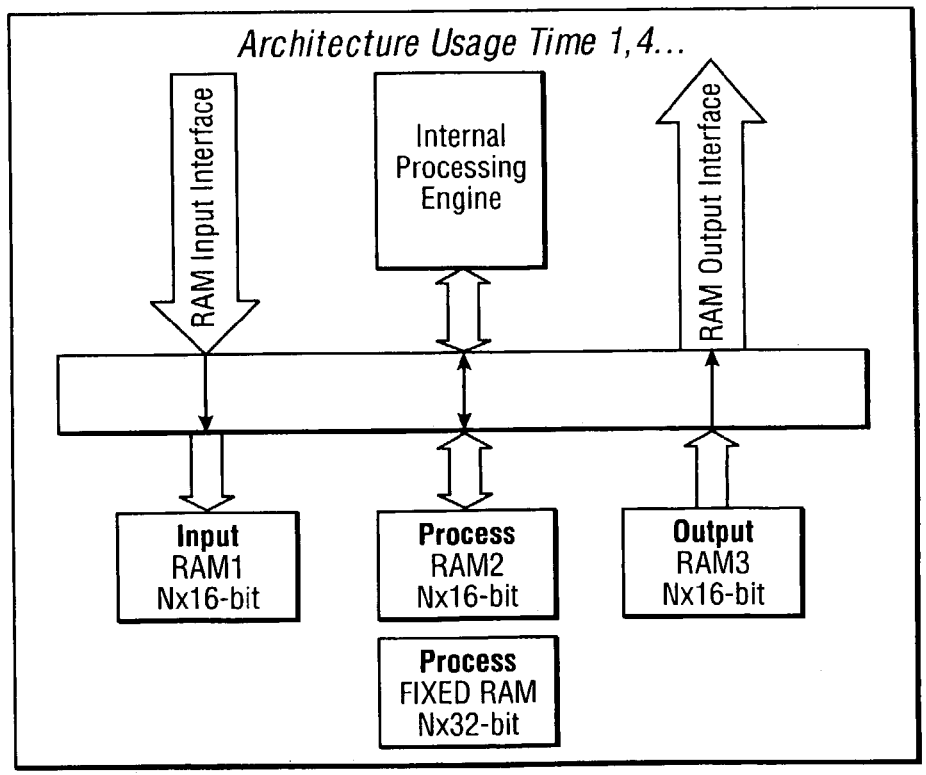
FIGS. 3B, 3C and 3D are block diagrams corresponding to FIG. 3A, showing the flow of data between elements of the system of FIG. 3A at different times.
Figure 3C:
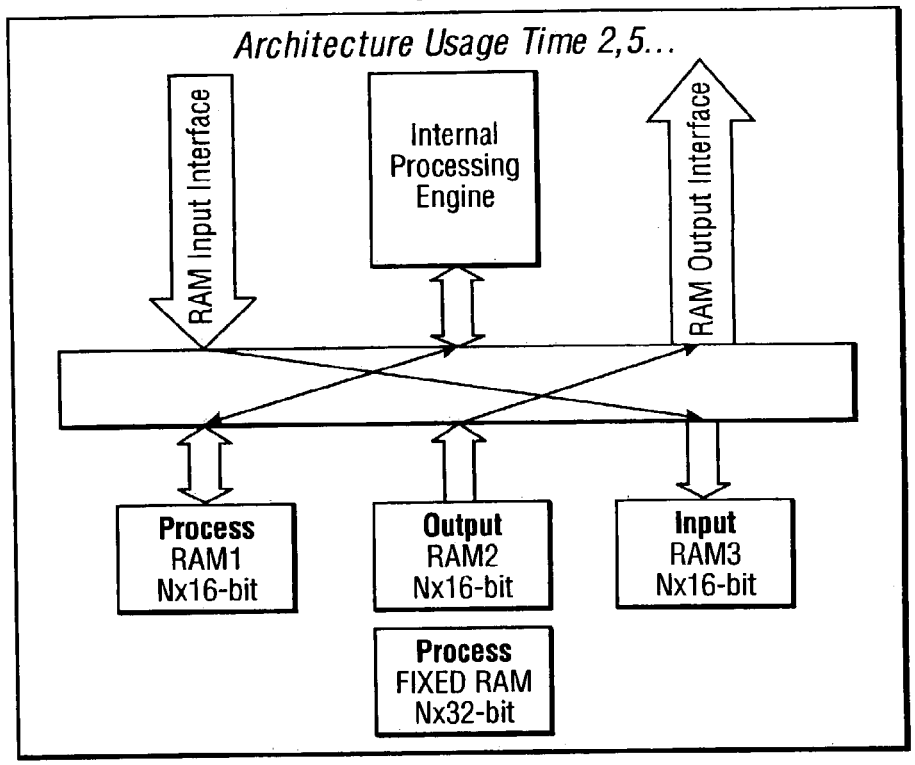
Figure 3D:
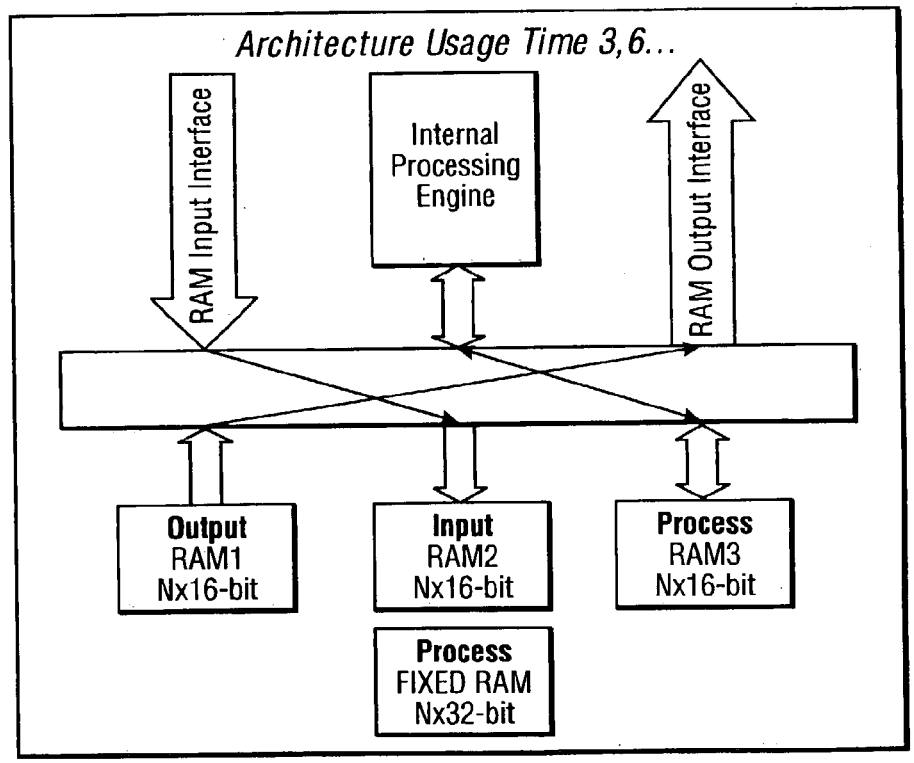
Figure 3E:
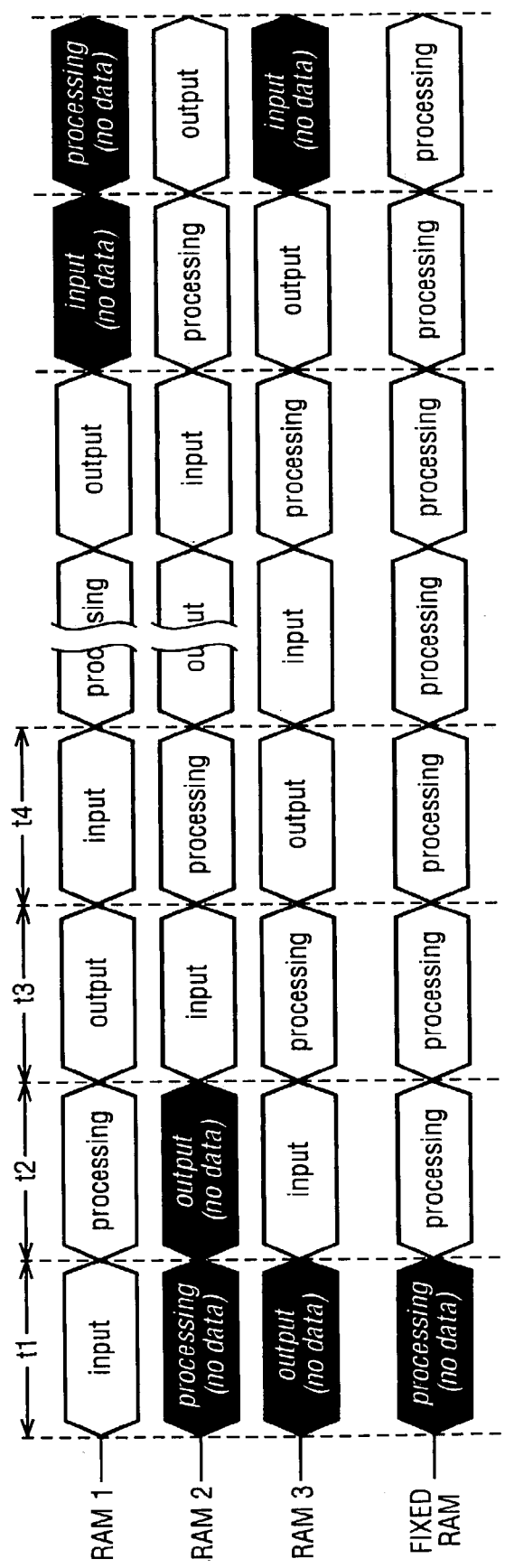
FIG. 3E is a timing diagram for the system of FIGS. 3A to 3D.

Still referring to FIGS. 3B to 3E, in each FFT operation, a received batch of input data samples which has been stored in one of the RAMs 50, 52 and 54 in a data input step is passed to a dedicated internal processing engine 30 in a processing step in which successive "butterfly" operations are performed to implement the FFT algorithm. Accordingly, in the case of RAM 50, a batch of samples which have been received in the data input step in time period t1 are read by the processing engine 30 in time period t2, processed, and written back to the same RAM 50, as shown in FIG. 3C and FIG. 3E. Concurrently, another batch of input data samples is being loaded into RAM 54, as shown in FIGS. 3C and 3E. In time period t3, the processed samples in RAM 50 are read to the RAM output interface 32 whilst the second batch of input samples loaded into RAM 54 are processed by the processing engine 30 and a third batch of new data samples are loaded into RAM 52, as shown in FIGS. 3D and 3E. As in the first prior art system, the input step, processing step and output step are rotated between three RAM 50, 52 and 54 from FFT operation to operation, each acting as a multiple-function memory area successively performing input, processing, and output functions. This rotation of memory areas is shown, also, in FIG. 3F.

Figure 3F:
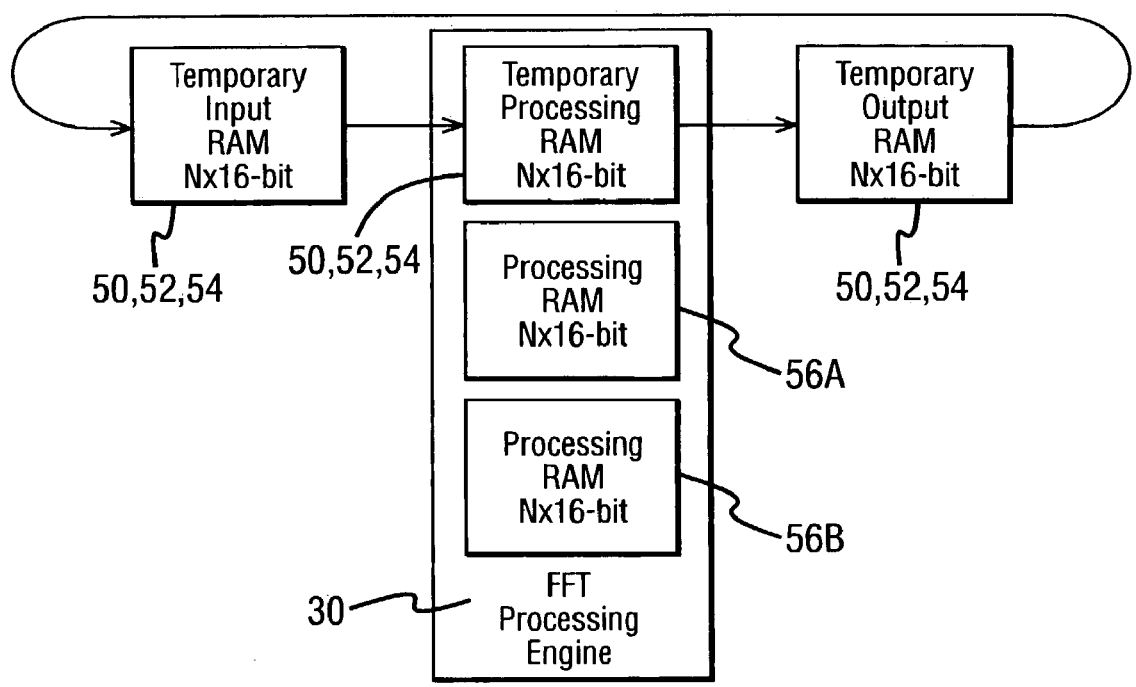
FIG. 3F is a memory management diagram for the system of FIG. 3A.

In contrast, however, to the first prior art system described above, the multiple-function RAMs are one-third of the size. For performing an N-point 16-bit FFT, the three rotating RAMs 50, 52 and 54 (FIG. 3A) are N×16-bit instances only. As mentioned above, the complex component in the received data samples is 0 and the bits for sign extension are redundant in the input step, whilst in the output data, which contains both real and complex components, only samples 0 to N/2 are unique, the other samples being the complex conjugates of samples 0 to N/2. Only during the processing step is additional memory capacity required and, as shown in FIGS. 3A and 3F, such memory capacity is provided by a dedicated or fixed processing RAM 56 made up of two N×16-bit RAM instances 56A, 56B (FIG. 3F). The situation is reversed when performing an N-point IFFT, the input data samples contain first samples 0 to N/2 and second samples from (N/2+1) to (N−1) which are complex conjugates of the first samples. In the IFFT output data samples, the complex components and the bits for sign extension are redundant.

To understand the interaction between the processing engine 30 and the multi-purpose RAMs 50, 52 and 54 on the one hand and the dedicated RAM 56 on the other hand, it is appropriate to consider the algorithm used by the processing engine 30 in performing the FFT.

Figure 4A:
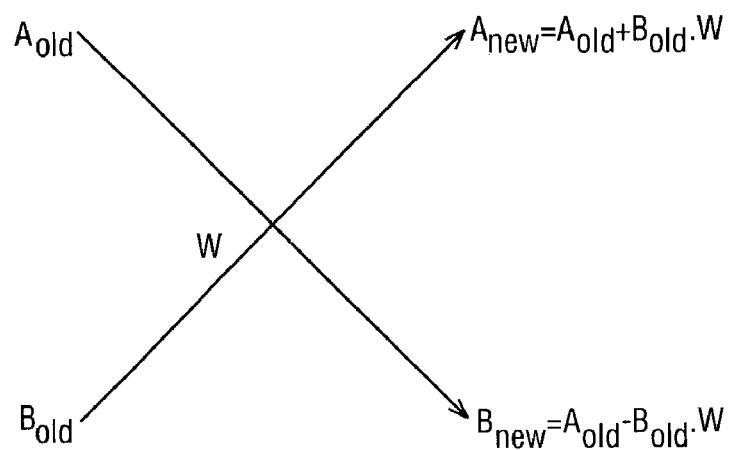
FIG. 4A is a diagram illustrating a basic element of an FFT algorithm.

The algorithm relies on a basic logic element often referred to as a "butterfly". The butterfly is shown in FIG. 4A. In the present embodiment of the invention, the butterfly is a hard-wired logic element, but it will be understood that programmable logic elements may be used, or the associated logical steps may be performed entirely in software, depending on the required speed of operation and the availability of suitable processing technologies. The butterfly has A and B ports. Each receives data, $A_{old}$ and $B_{old}$, from respective memory locations and the butterfly performs the two expressions shown to form output data $A_{new}$ and $B_{new}$ at the A and B ports respectively. The output data is written back to the same memory locations. For this reason, the algorithm is known as an "in-place" algorithm, having the property that it used no more memory than is required to store the data uses by the algorithm.

Figure 4B:
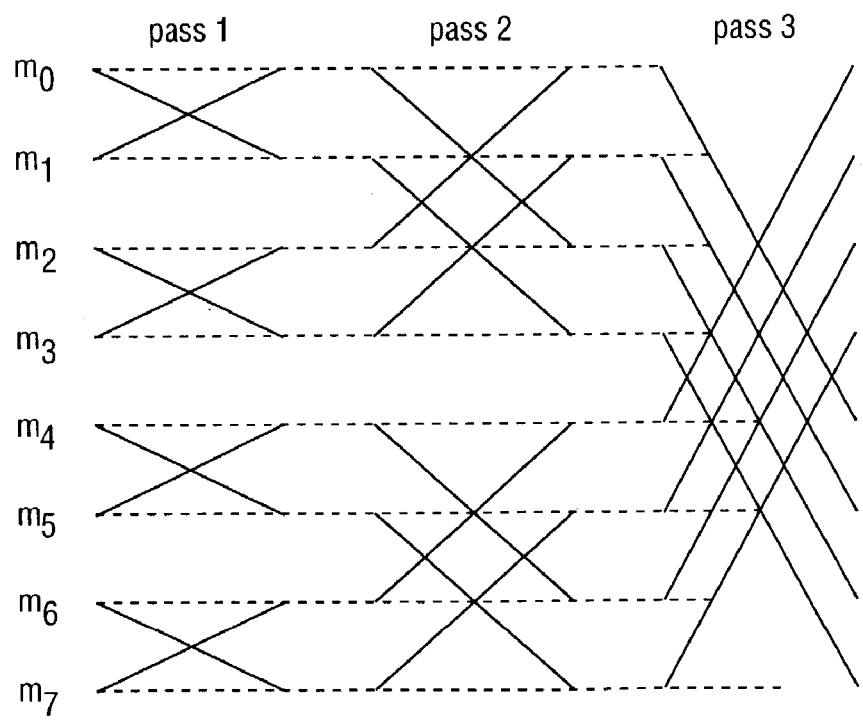
FIG. 4B is a diagram illustrating the repeated application of the algorithm element of FIG. 4A in performing an FFT.

Referring to FIG. 4B the butterfly in this embodiment processes the data in a particular order. It should be appreciated that FIG. 4B is a simplified illustration in that it shows the application of the butterfly to performance of an 8-point FFT. Each butterfly takes data from two out of eight memory locations $m_0$ to $m_7$. In a first calculation pass, the butterfly is applied to data from memory locations $m_0$ and $m_1$, then to data from locations $m_2$ and $m_3$, and so on. In the next pass, the butterfly is applied to data resulting from the application of the butterfly in the first pass, this time taking, firstly, data from locations $m_0$ and $m_2$, then data from locations $m_1$ and $m_3$, and so on, as shown in FIG. 4B. Finally, in a third, final pass, the butterfly is applied to the data resulting from the second pass in locations $m_0$ and $m_4$, then $m_1$ and $m_5$ and so on.

In the general case, if N is the number of points of the transform, then N/2 butterfly calculations are required to process the data once, i.e. four calculations for each pass in the example above. The data gets passed over $\log_2 N$ times, i.e. three passes in the above simplified example. The total number of calculations is $N/2 \times \log_2 N$. As the passes progress, the number of butterflies in each group doubles with each pass, and the number of groups halves.

Since W in the expressions of FIG. 4A is a complex number (the "twiddle factor"), the first butterfly pass produces a first pair of intermediate data values which contain both real values and complex values.

W is part of the standard FFT algorithm.

$$W_{nk} = e^{-j\frac{2\pi nk}{N}}$$

Complex values are present, in the general case, in all of the subsequent intermediate values and in the values resulting from the final pass. Accordingly, while the received data samples, having real components only, can be stored in an N×16-bit RAM instance, indicated as RAMs 50, 52 and 54 in FIG. 3A, as soon as the first pass has been performed during the processing step, additional memory capacity is required. This is provided by the fixed RAM instance 56. In the preferred embodiment shown in FIG. 3A, the real intermediate values are stored in the multiple-function RAM instances and the imaginary intermediate values are stored in the dedicated RAM instance 56. Additionally, sign extension bits are stored in the dedicated processing RAM 56.

The flow of data on the final pass will be described below. First, however, the structure of the system will be described in more detail with reference to FIG. 5, which shows a system for performing an 8192-point FFT.

Figure 5A:
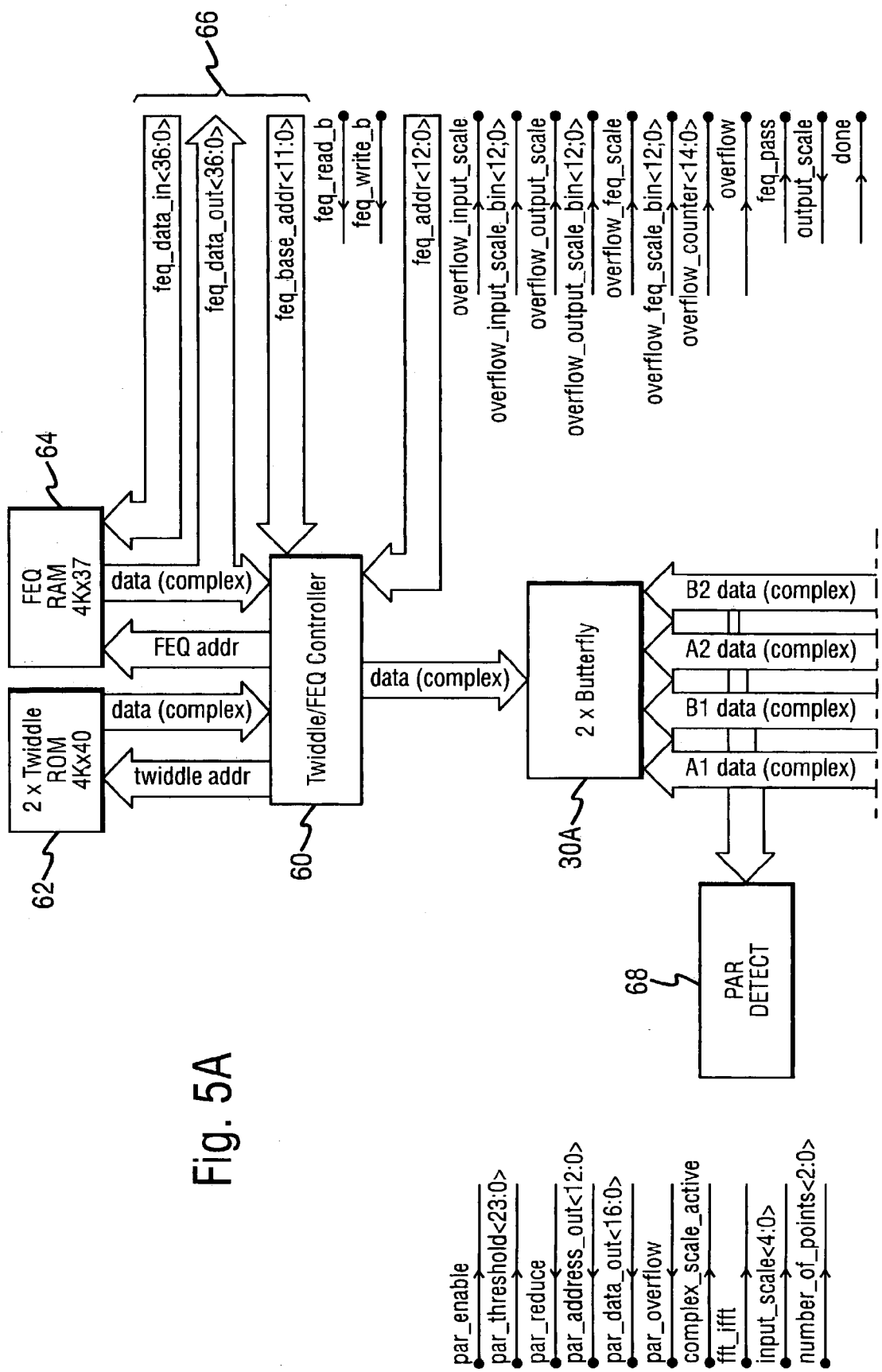
FIG. 5 is a more detailed block diagram of the system of FIG. 3A.
Figure 5B:
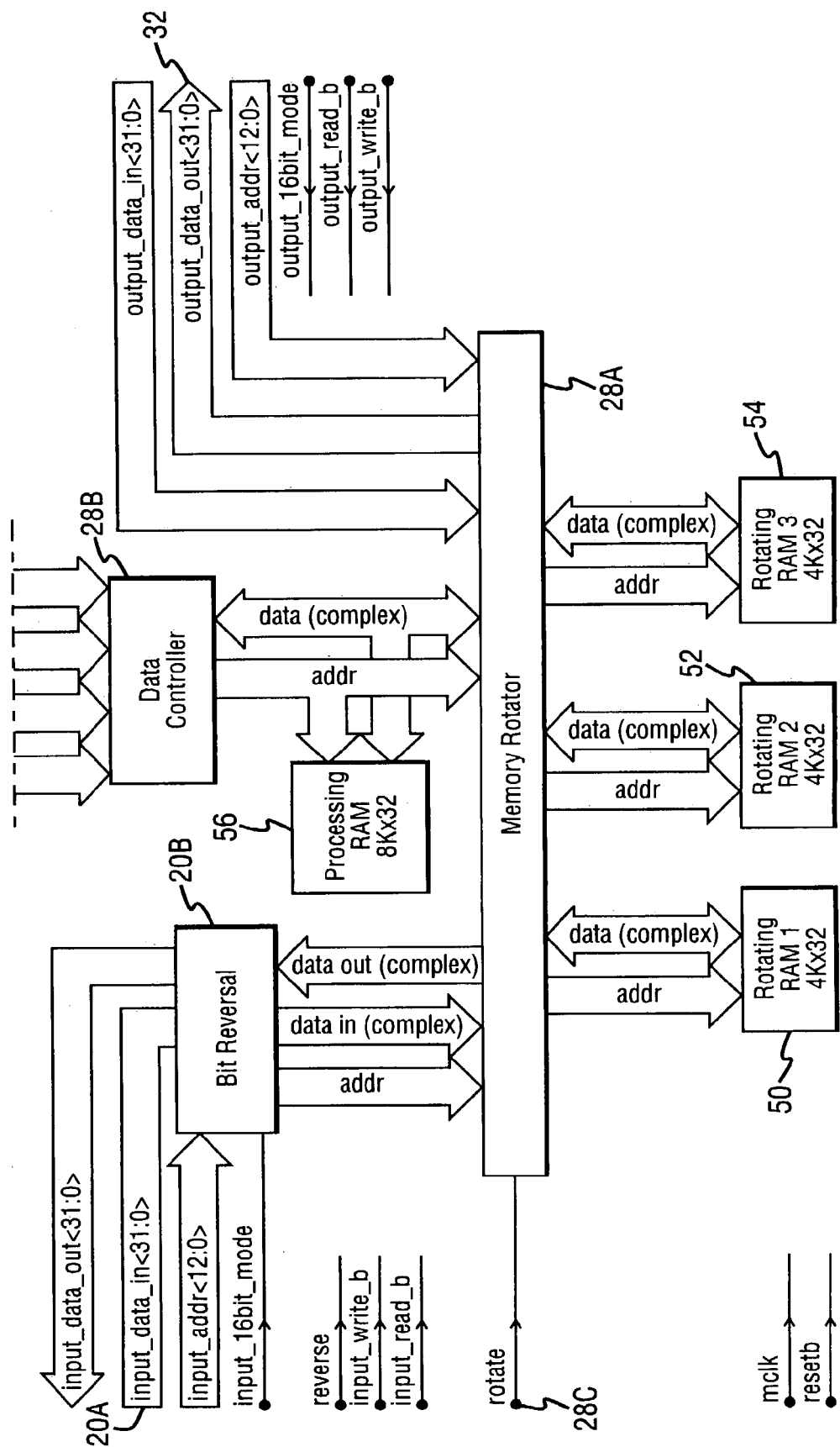

Referring to FIG. 5, the input interface has a system input 20A, and a bit reversal stage 20B. The processing engine comprises a pair 30A of butterfly elements. The multiple-purpose RAMs in this embodiment are each 4 k×32 RAMs 50, 52 and 54 which, together with the dedicated processing RAM (having a capacity of 8 K×32) are coupled to the bit reversal stage of the input interface, the processing engine, and the output data interface 32 by decode logic which comprises a memory rotator 28A and a data controller 28B, the latter being disposed between the butterflies 30A and the memory rotator 28A. The memory rotator has a rotate input 28C for receiving rotate command signals. The two butterflies of the processor 30A operate in parallel which means that the 53,248 (N/2 $\log_2 N$) butterfly calculations required for the 8192-point FFT can be performed in 26,624 clock cycles, plus some latency. The three multiple-purpose RAMs 50, 52 and 54 (here referred to as "rotating" RAMs), offer the parallel functions of inputting, processing, and outputting, as described above. All memory ports offer read and write functions. Also as described above, the data input/output requirements are such that the rotating memory size can be one third the size of the total processing memory. Thus, the effective size of the input memory instance is 8 k×16 which, for FFT operation can hold 8 k 16-bit real time-domain samples or, for IFFT operation, 4 k 32-bit (16-bit complex) frequency-domain bins. The processing memory size is 8 k by 48 (8 k, 24-bit complex processing).

The memory rotator 28A detects the rotate signal received on rotate input 28C and controls which interface, input port, output port, or butterfly drives each RAM.

The bit reversal stage performs address bit reversal of incoming data for the FFT algorithm. Thus the incoming data is loaded by bit-reversing the address. For instance, in the case of a 16-pt FFT, a 4-bit address is used to load the data. Indexing from 0 to 15, data point 5 has binary address 0101. This is bit reversed to binary address 1010 and this address is used to load the data, i.e. loaded into location 10 not 5.

The data controller handles data transferred to and from the RAMs used in processing and also contains a scaling function. This is used to scale the input data from 16-bit precision to 24-bit precision for intermediate processing and then to scale the result back to 16-bit precision prior to the output step. High resolution is only required during processing to improve numerical accuracy.

The system also contains a twiddle/FEQ (frequency equalisation) controller 60 and an accompanying twiddle ROM 62 and FEQ RAM 64. Controller 60 feeds ROM twiddle factors or FEQ coefficients to the butterflies. It also handles an external interface 66 to the FEQ RAM 64. The twiddle factors mentioned above are complex numbers.

$$e^{-j\frac{2\pi nk}{N}} = \cos\left(\frac{2\pi nk}{N}\right) j\sin\left(\frac{2\pi nk}{N}\right)$$

The sine and cosine waves required are obtained via a look-up table stored in the ROM and indexed via use of n, k and N as part of the algorithm.

A PAR detect block 68 handles peak detection of time-domain data during IFFT operation.

The purpose of the FEQ controller 60 and associated memories 62 and 64 is to perform an FEQ pass after the FFT operation if required. This is a multiplication operation on the 4,960 pairs generated by the FFT. This may be done using complex multipliers in which case the FEQ pass may be achieved in 2,048 clock cycles.

The data flow in the system shown in FIG. 5 when performing an 8192-point FFT will now be described with reference to FIG. 6. It will be recalled that the rotating RAMs are used for real data during processing. Respective portions of the dedicated processing RAM 56 are used for imaginary data and width extension of the real and imaginary components during processing. This applies to all FFT processing steps except the FEQ pass referred to above.

Referring to FIG. 6, each batch of received input data for the FFT comprises 8 k or 16-bit real time samples. These are loaded in the data input step in one of the rotating RAMs 50, 52 and 54, the addresses having been bit reversed in the bit reversal stage 20B, with the result that the samples are loaded into the rotating RAM in 128-bit groups, each group containing eight samples in reverse order, as shown in the memory mapping block 70. At the commencement of the processing step, input scaling is performed and the imaginary part is taken as zero. Subsequent applications of the butterflies produce complex samples, the real values of which are stored in the respective rotating RAM 50, 52 and 54, and the imaginary parts of which are stored in the processing RAM 56 along with the width extension bits. The imaginary parts of the intermediate values are stored in an order corresponding to the order of the real bits, as shown in my memory mapping blocks 72 and 74 in FIG. 6.

On the final pass, output scaling is applied. The resulting data is 8 k 32-bit frequency-domain pairs but, since only half of these are unique, the complex conjugates are not stored and only the first 4 k of data is written to memory. In the previous passes, the rotating RAM 50, 52 or 54 handled real data only. In the final pass, it is packed with real and imaginary frequency data as shown by the memory mapping block 76, before rotation to the output port in the output step. In this example, this is achieved conveniently by virtue of the fact that, on the final pass, the butterflies are at maximum spread (as shown analogously in pass 3 in FIG. 4B), i.e. butterfly 1 takes A data from address 0 and B data from address 4096. Consequently, the B output data creates the complex conjugate data and can be ignored. The A output data is written to the respective rotating RAM 50, 52 or 54, and packed in real/imaginary pairs into the locations where the A and B input real data came from, as shown in FIG. 6.

If frequency equalisation is to be performed, it is performed on the data resulting from the final butterfly pass.

In the subsequent data output step, address decoding, using a 13-bit address on the output address lines 80 (see FIG. 5) are used for unloading the data. Bit 2 becomes the MSB for invisible access to the pattern. This results from the way the data is loaded into the rotating memory on the final pass into locations where the real parts of A and B came from, as stated above. This particular addressing results from the way in which the final data is distributed through the memory. It will be noted that in FIG. 6, RAM 76 stores complex numbers 0 to 3 in locations 0 to 3, and complex numbers 4 to 7 in locations N/2 to N/2+3. When the binary address has bit 2 set as in addresses 4 to 7, the data exists in the higher half of the memory and thus by moving bit 2 to the MSB, the data intended is obtained.

Addresses 0 return DC and Nyquist real components.

In summary, therefore, the final pass (ignoring any FEQ pass) writes back to memory only half of the frequency pairs data. The other half, comprising complex conjugates of the first half, are dispensed with. The Nyquist sample (R4096) (the highest real value of the first half) replaces the first imaginary value (I0).

The system described above in accordance with the invention may be used for performing an IFFT as well. In this case, data comprising frequency-domain pairs is loaded in batches, with bit-reversed addressing. The butterfly is essentially the same as for performing an FFT. The only difference is that when the twiddle factors are loaded from the ROM, the sine component is 2's complemented before entering the butterfly calculation. The first butterfly pass during the processing step performs input scaling as before. As a batch of data is read from the respective rotating RAM 50, 52, 54, is it handled in an order such that the complex conjugate data can be created as the input scaling is performed, and so that the resulting data can be used with the read data. This determines the order in which the butterflies are applied.

By way of explanation the principle will be described below with reference to FIGS. 7A and 7B using a 32-point IFFT.

Referring to FIG. 7A, the input frequency pairs are shown in the first column 90 of numbers in sequential order and as expected to be received at the data input interface. Bearing in mind that only half of the received samples are unique the actual source of the frequency pairs used for processing is the unique samples and internally created complex conjugates, as shown by column 92 in FIG. 7A. Accordingly, frequency pairs 0 to 16 are received via the input interface, whilst frequency pairs 17 to 31 are created internally by calculating the complex conjugates of samples 15 down to 1.

Referring next to FIG. 7B, column 94 shows the frequency pairs in the order in which they are presented for processing in the processing step, which order is created by address bit-reversal. In column 94, the numbers appearing in bold represent samples received at the input interface, whilst the other numbers are those created internally as complex conjugates. The remaining column, column 96, indicates the actual source of the samples in column 94.

In a manner analogous to the application of the butterflies in the simplified example described above with reference to FIG. 4B, the butterflies in this case are applied in four groups, as shown on the right hand side of FIG. 7B, starting at the top. The data is processed in pairs of butterfly calculations, a and b, each butterfly calculation requiring two input numbers. As in the previous illustration, the butterfly groups grow in size as the algorithm progresses down the data, as shown.

The first pair of calculations to be done is group 1, 1a and 1b. Three of the data points are read from two locations, bearing in mind that DC and Nyquist samples are entered as a pair. The fourth data point is the complex conjugate of bin 8, which is conveniently created since bin 8 has been read at this time. The complex conjugate is created, and the two butterfly calculations can be performed.

Next, the butterflies are applied in group 2 calculations 1a and 1b. Bin 4 and bin 12 are read, the conjugates created, and the data is then complete for these two butterflies. Next, calculations 1a and 1b of group 3 are performed together, as are calculations 2a and 2b of group 3, as so on.

This process, as applied to the 819-point IFFT, produces the memory mappings shown in FIG. 8. In the data input step, as described above with reference to FIGS. 7A and 7B, the respective rotating RAM 50, 52 and 54 (FIG. 5) receives a batch of frequency-domain data consisting of 4 k×32-bit frequency-domain pairs (16-bit real and 16-bit imaginary parts) in bit reversed form in bit-reversal stage 20B using 12 MSBs of a 13-bit address. In accordance with the above description, only the first 4,096 samples are stored, as shown in memory mapping block 100 in FIG. 8.

In the first pass of the processing step the butterflies are applied in the manner described above in relation to the FFT process, and complex conjugate data is created for the lower symmetrical butterflies; i.e. the complex conjugate data supplies the B input of the first pass butterflies. This results in real and imaginary values stored respectively in the respective rotating RAM 50, 52, 54 and the dedicated processing RAM 56, as shown by memory mapping blocks 102 and 104 in FIG. 8. Application of the butterflies continues as described above in relation to the FFT process. Output scaling is performed during the final pass and the resulting real data from the final pass is written into the same rotating RAM 50, 52, 54 for subsequent output in the data output step.

The embodiment described above is a single-channel FFT or IFFT system. The invention may be applied to multiple-channel FFT or IFFT processing. This may be achieved using a plurality of processing engines operating independently to perform the processing steps of each FFT simultaneously. However, greater memory efficiency is available if the corresponding number of processing elements (butterflies) are operated in parallel on a single FFT (or IFFT) at a time rather than on the plural FFTs or IFFTs in parallel, so that the transforms are processed sequentially.

This sequential processing allows the memory requirement to be restricted to substantially the same as that for single-channel FFT or IFFT processing. Accordingly, the storage capacity required for multiple channel processing is 1/M of that required for the input step or the output step respectively where M is the number of channels.

Figure 9:
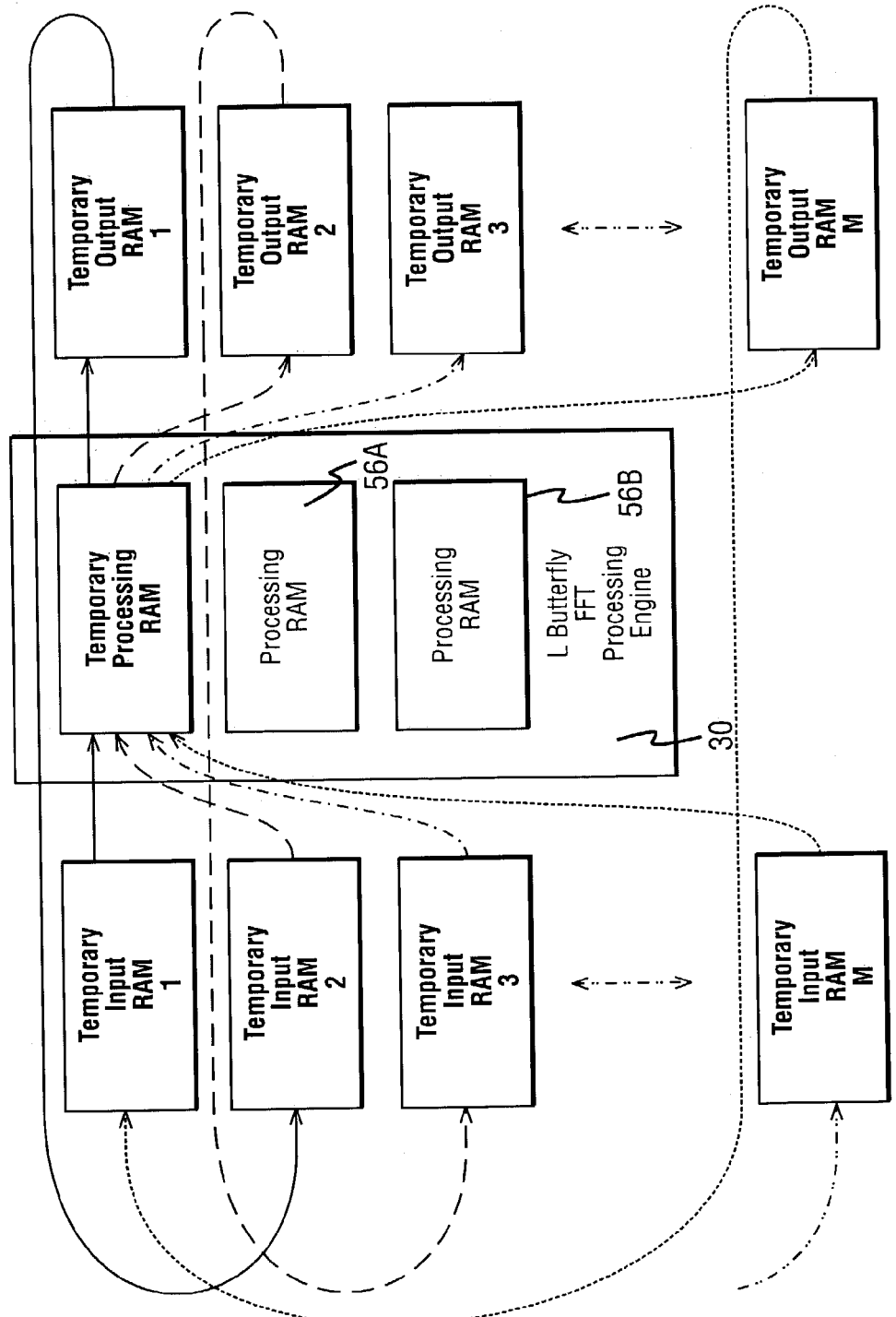
FIG. 9 is a memory management diagram for an alternative embodiment in accordance with the invention.

Referring to FIG. 9, multiple-purpose RAMs may have their functions or duties rotated in such a way that each functions for inputting a first batch of samples in a first channel, followed by processing of those samples, followed by outputting the corresponding batch of output samples, after which it performs the same three functions in respect of a batch of data in the second channel, then the third channel, and so on until it has performed these functions on all of the channels, whereupon the sequence is repeated as described above with reference to the single-channel FFT process. Intermediate values in the processing step are stored in the rotating RAM (which can be any of (2M+1) RAMs, as shown in FIG. 9), whereas the imaginary values and sign extension bits produced during the processing step are stored in the dedicated processing RAM 56A, 56B.

The processing engine 30 has L butterflies. If the configuration of the processing engine 30 is like that of the single-channel embodiment described above with reference to FIG. 5, L equals 2M. However, other numbers of butterflies are possible depending on, for instance, processing speed requirements.

Figure 10:
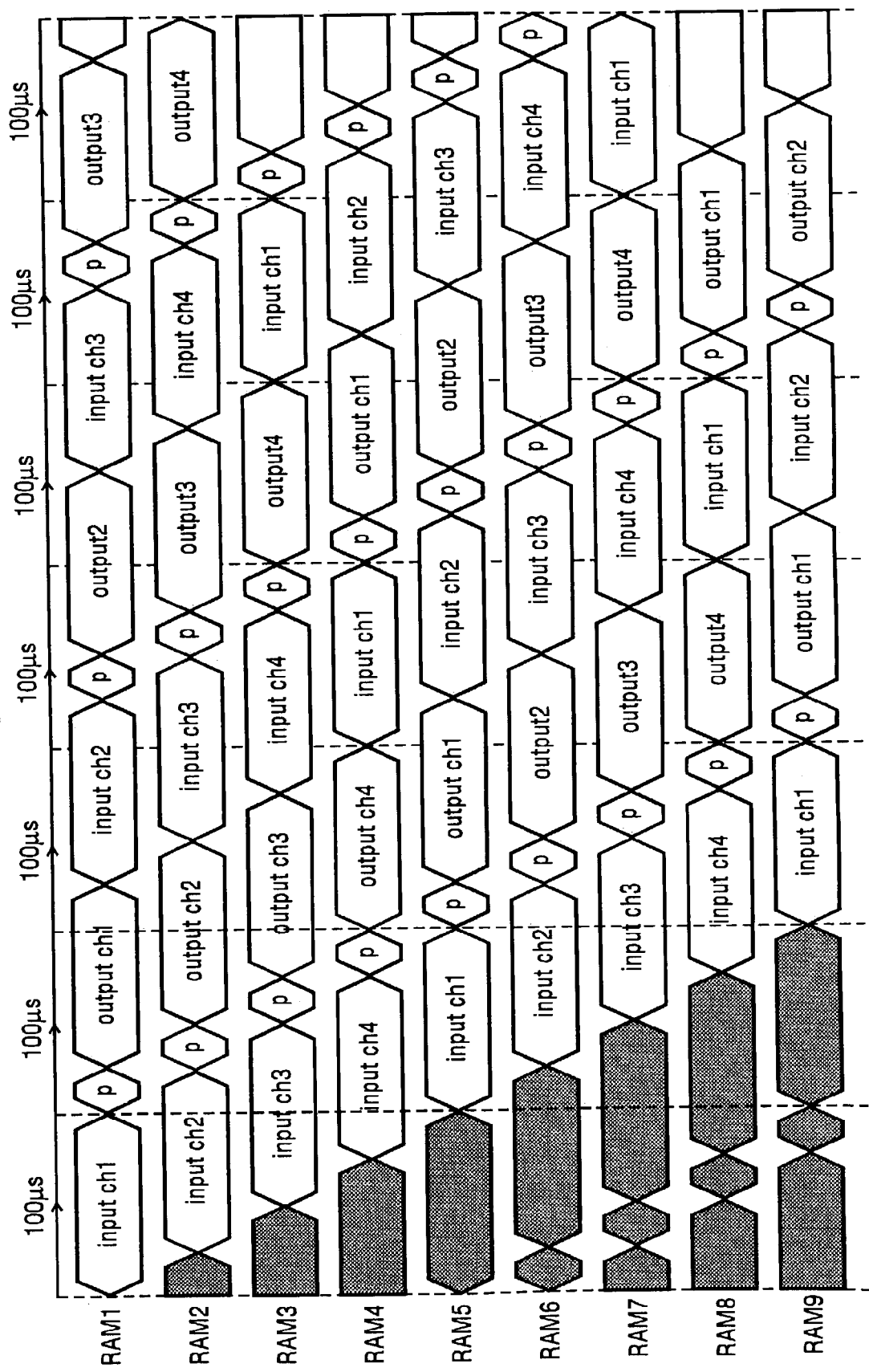
FIG. 10 is a timing diagram for the alternative embodiment.

The timing diagram of FIG. 10 shows how each RAM in a four-channel FFT or IFFT system is used. In this case there are nine multiple-function RAMs. Each of these RAMS functions for inputting, processing, and outputting on a first channel, then a second channel, then a third channel and, finally, the fourth channel before repeating the sequence, as described above. Each RAM loads data, is involved in processing the data, and then outputs the resulting output data. When it rotates to a new loading location, it loads for a next, consecutive, channel. It will be noted that the processing step in each channel is performed in a much shorter time than in the single-channel embodiment described above. This is because a larger number of processing elements is applied in parallel on each channel. Thus, the processing steps are carried out sequentially. Indeed, in the four-channel example, four processing operations are carried out during the same time period required for the inputting of data in a single channel.

It will be appreciated that since the processing steps of respective channels are carried out sequentially, only a single RAM instance is required for processing at any given time, yielding a greater saving in RAM capacity compared with the first above-described prior art system when used for multiple-channel processing than the saving achieved for single-channel processing. The greater the number of channels, the greater the potential saving in RAM capacity.

What is claimed is:

1. A method of performing a fast-Fourier transform (FFT) in which input data samples are written to a storage instance in a data input step, then subjected to a processing step in which the stored input samples are read out of the storage instance and processed in accordance with a transformation algorithm, the resulting output data samples being written back to the storage instance, and, in a transformed data output step, read out of the storage instance, successively received batches of the input data samples being fed cyclically to a plurality of such multiple-function storage instances, each batch to a respective instance, such that, at any given time during performance of the method, the input step, the processing step and the output step are being performed simultaneously in respect of different said batches using different respective said storage instances, wherein, for each received data input batch, the processing step comprises a plurality of calculation passes creating intermediate data values which are stored between passes in both the respective one of the said multiple-function storage instances and a further storage instance substantially dedicated for use in such processing steps.

2. A method according to claim 1, in which, of the data making up the intermediate data values stored between calculation passes of the processing step, as least as much data is stored in the dedicated storage instance as in the multiple-function storage instance.

3. A method according to claim 1, wherein the intermediate data values contain real values and imaginary values, the real values being stored in the respective multiple-function storage instance and the imaginary values in the dedicated storage instance.

4. A method according to claim 3, wherein the processing step has a final calculation pass producing first and second sets of output data samples derived from the respective input data batch, the samples of the second set being the complex conjugates of the samples of the first set, and wherein the real and imaginary parts of the first set only are stored in the respective multiple-function storage instance.

5. A method according to claim 4, wherein DC and Nyquist points resulting from the final calculation pass are stored as a pair in the respective multiple-function storage instance.

6. A method according to claim 4, in which the transformed data output step includes address decoding to cause the data to be read out in a different order from that in which it was stored at the end of the processing step.

7. A method of performing an inverse fast-Fourier transform (IFFT) in which input data samples are written to a storage instance in a data input step, then subjected to a processing step in which the stored input samples are read out of the storage instance and processed in accordance with a transformation algorithm, the resulting output data samples being written back to the storage instance, and, in a transformed data output step, read out of the storage instance, successively received batches of the input data samples being fed cyclically to a plurality of such multiple-function storage instances, each batch to a respective instance, such that, at any given time during performance of the method, the input step, the processing step and the output step are being performed simultaneously in respect of different said batches using different respective said storage instances, wherein, for each received data input batch, the processing step comprises a plurality of calculation passes creating intermediate data values which are stored between passes in both the respective one of the said multiple-function storage instances and a further storage instance substantially dedicated for use in such processing steps.

8. A method according to claim 7, in which of the data making up the intermediate data values stored between calculation passes of the processing step, as least as much data is stored in the dedicated storage instance as in the multiple-function storage instance.

9. A method according to claim 7, wherein the intermediate data values contain real values and imaginary values, the real values being stored in the respective multiple-function storage instance and the imaginary values in the dedicated storage instance.

10. A method according to claim 9, wherein the processing step has an initial calculation pass including the generation of the complex conjugates of samples stored in the respective multiple-function storage instance in the data input step.

11. A method according to claim 10, wherein the data input step includes storing DC and Nyquist points as a pair in the respective multiple-function storage instance.

12. A method according to claim 10, in which the data input step includes writing the input data samples to the respective multiple-function storage instance with bit-reversed addressing.

13. A fast-Fourier transformation system for transforming input data samples received in batches at a system input into transformed output data samples delivered to a system output in corresponding batches, wherein the system comprises:
a plurality of multiple-function storage instances;
control means for controlling writing of data to and reading of data from the storage instances; and
a processor core arranged to read stored data samples, to process them in accordance with a transformation algorithm and to store the resulting output data samples; each received input data batch being subjected to a plurality of calculation passes creating intermediate data values which are stored between the passes;
wherein the control means are arranged such that successively received input data sample batches are fed cyclically in a data input step to the multiple-function storage instance, each batch being fed to a respective one of the said storage instances, such that the data samples processed in the processor core as part of a processing step are read from the same storage instance as that to which they were fed when received from the system input as input data samples in the data input step, the resulting output data samples being written to the same storage instance and, in a data output step, read from the same storage instance to the system output, and such that the input step, the processing step and the output step are performed simultaneously in respect of different said batches using different respective said storage instances,
and wherein the system further comprises a further storage instance, the control means being further arranged such that the said intermediate data values are stored in both the respective multiple-function storage instance in which the corresponding input samples were stored and in the further storage instance, the primary function of the further storage instance being the storage of the intermediate values.

14. A system according to claim 13, wherein the storage capacity of the further storage instance is at least as large as that of each of the multiple-function storage instances.

15. A system according to claim 13, wherein the control means are arranged such that, of the intermediate data values, the real values are stored in the respective multiple-function storage instance and the imaginary values are stored in the said further storage instance.

16. A system according to claim 13, wherein the processor core and the control means are arranged such that the said plurality of calculation passes include a final calculation pass producing first and second sets of output data samples derived from the respective input data batch, the samples of the second set being the complex conjugates of the samples of the first set, and the real and imaginary parts of the first set only are stored in the respective multiple-function storage instance.

17. A system according to claim 16, wherein the processor core and the control means are arranged such that DC and Nyquist points resulting from the final calculation pass are stored as a pair in the respective multiple-function storage instance.

18. A system according to claim 16, including address decoding means for causing the output data samples to be read out from the respective multiple-function storage instance in a different order from that in which it was stored after processing by the processor core.

19. An inverse fast-Fourier transformation system for transforming input data samples received in batches at a system input into transformed output data samples delivered to a system output in corresponding batches, wherein the system comprises:
a plurality of multiple-function storage instances;
control means for controlling writing of data to and reading of data from the storage instances; and
a processor core arranged to read stored data samples, to process them in accordance with a transformation algorithm and to store the resulting output data samples; each received input data batch being subjected to a plurality of calculation passes creating intermediate data values which are stored between the passes, wherein the control means are arranged such that successively received input data sample batches are fed cyclically in a data input step to the multiple-function storage device, each batch being fed to a respective one of the said storage instances, such that the data samples processed in the processor core as part of a processing step are read from the same storage instance as that to which they were fed when received from the system input as input data samples in the data input step, the resulting output data samples being written to the same storage instance and, in a data output step, read from the same storage instance to the system output, and such that the input step, the processing step and the output step are performed simultaneously in respect of different said batches using different respective said storage instances, and wherein the system further comprises a further storage instance, the control means being further arranged such that the said intermediate data values are stored in both the respective multiple-function storage instance in which the corresponding input samples were stored and in the further storage instance, the primary function of the further storage instance being the storage of the intermediate values.

20. A system according to claim 19, wherein the storage capacity of the further storage instance is at least as large as that of each of the multiple-function storage instances.

21. A system according to claim 19, wherein the control means are arranged such that, of the intermediate data values, the real values are stored in the respective multiple-function storage instance and the imaginary values are stored in the said further storage instance.

22. A system according to claim 21, wherein the control means are arranged such that the said plurality of calculation passes have an initial calculation pass including the generation of the complex conjugates of samples stored in the respective multiple-function storage instance in the data input step.

23. A system according to claim 22, wherein the control means are arranged such that the data input step includes storing DC and Nyquist points as a pair in the respective multiple-function storage instance.

24. A system according to claim 23, further comprising bit-reversal means coupled to the system input for causing the input data samples to be written to the respective multiple-function storage instance with bit-reversed addressing.

* * * * *